United States Patent [19]
Schenkel et al.

[11] Patent Number: 4,796,022
[45] Date of Patent: Jan. 3, 1989

[54] DOUBLE TRANSIT BUS SYSTEM

[75] Inventors: David P. Schenkel; Frank Mellor, both of Ottawa, Canada

[73] Assignee: Northern Telecom Limited, Montreal, Canada

[21] Appl. No.: 190,325

[22] Filed: May 5, 1988

Related U.S. Application Data

[63] Continuation of Ser. No. 811,125, Dec. 19, 1985, abandoned.

[51] Int. Cl.⁴ .................................................. H04Q 1/00
[52] U.S. Cl. ................................... 340/825.08; 370/96
[58] Field of Search ........................... 370/90, 96, 85; 340/825.05–825.13, 310 R

[56] References Cited

U.S. PATENT DOCUMENTS

| | | | |
|---|---|---|---|
| 3,755,782 | 8/1973 | Haas et al. | 340/825.08 |
| 3,824,545 | 7/1974 | Brenner et al. | 370/90 X |
| 4,047,159 | 9/1977 | Boudry | 340/825.08 X |
| 4,149,144 | 4/1979 | Diefenderfer | 370/96 X |
| 4,173,754 | 11/1979 | Feiker | 340/310 R |
| 4,385,382 | 5/1983 | Goss et al. | 370/96 |
| 4,489,416 | 12/1984 | Stuart | 340/825.08 |
| 4,506,360 | 3/1985 | Kryskow, Jr. et al. | 370/85 |
| 4,546,351 | 10/1985 | Nambu | 340/825.08 X |
| 4,595,921 | 6/1986 | Wang et al. | 340/825.08 |

FOREIGN PATENT DOCUMENTS 0051639 3/1984 Japan .............................. 340/825.08

Primary Examiner—Ulysses Weldon
Attorney, Agent, or Firm—Robert C. Hogeboom

[57] ABSTRACT

A bus system for exchanging information between a plurality of circuits connected to the system. The bus system includes a polling bus, a message bus, and a bus controller. The bus controller polls each circuit to see if the circuits require access to the message bus. Information between the circuits is conveyed by first transmitting the information to the bus controller where it is temporarily stored. That information is then sent to the destination circuit by the bus controller. Information is thus conveyed over the message bus twice for every exchange of informaton between two circuits.

6 Claims, 2 Drawing Sheets

DOUBLE TRANSIT BUS SYSTEM

This application is a continuation of application Ser. No. 811,125 filed Dec. 19, 1985, now abandoned.

BACKGROUND OF THE INVENTION

This invention relates generally to a bus arrangement or bus system, and more particularly to a bus system having unique features for transferring data between circuits connected to the bus.

Many bus arrangements exist in the prior art. Some of these arrangements are packet buses, TDM (Time Division Multiplex) buses, and system buses. One application of the bus arrangements noted above is to send information from one device connected to the bus to another device connected to the bus. These buses share the common feature that this exchange of data takes place directly between the two devices involved over the bus that links all the devices. Common control equipment may play a part in arranging or setting up the connection between the two devices, but the data flow occurs directly between the two devices over the bus linking all the devices.

SUMMARY OF THE INVENTION

The present invention differs from known buses in that the transfer of data does not occur directly between the two devices wishing to communicate over the bus, but rather, is transferred via a third device. According to the present invention, the data from a source device is sent first to an intermediate bus control device connected to the bus, and is then forwarded to the destination device.

The bus control circuit cannot force a device on the bus to transmit or to receive. Rather, each device on the bus decides when it will request bus access, and whether it will transmit or receive a message (or do nothing) when the device is granted bus access.

In simplistic terms, the present invention comprises a polling bus and a message bus with a plurality of devices connected to bus buses. A bus control circuit is also connected to both buses and is used to control access to the message bus. The bus control circuit includes a polling circuit which polls each device via the polling bus (in a round-robin fashion) to determine whether or not it wants access to the message bus.

Once a device is granted access to the message bus, the data to be transferred flows from that device to the bus control circuit and on a subsequent grant to the destination device (all via the message bus).

One advantage of such a scheme is that it reduces the complexity and buffer requirements of the bus interface in each device connected to the bus, centralizing them in the bus control circuit.

Stated in other terms, the present invention is a bus system for facilitating the transfer of information between a plurality of circuit means connected to the bus system, the bus system comprising: a polling bus; a message bus; and a bus controller means, connected to both the polling bus and the message bus, both for controlling the polling bus and for exchanging information with the message bus; whereby information from a first circuit means of the plurality of circuit means, bound for a second circuit means of the plurality of circuit means, is transmitted on the message bus via the bus controller, is temporarily stored at the bus controller, and is subsequently transmitted to the second circuit means; and whereby transmission or reception of messages is controlled by the first or second circuit means and access to the message bus is controlled by the bus controller.

BRIEF DESCRIPTION OF THE DRAWINGS

The present invention will now be described in more detail with reference to the accompanying drawings, wherein like parts in each of the several figures are identified by the same reference character, and wherein.

DETAILED DESCRIPTION

Figure 1:
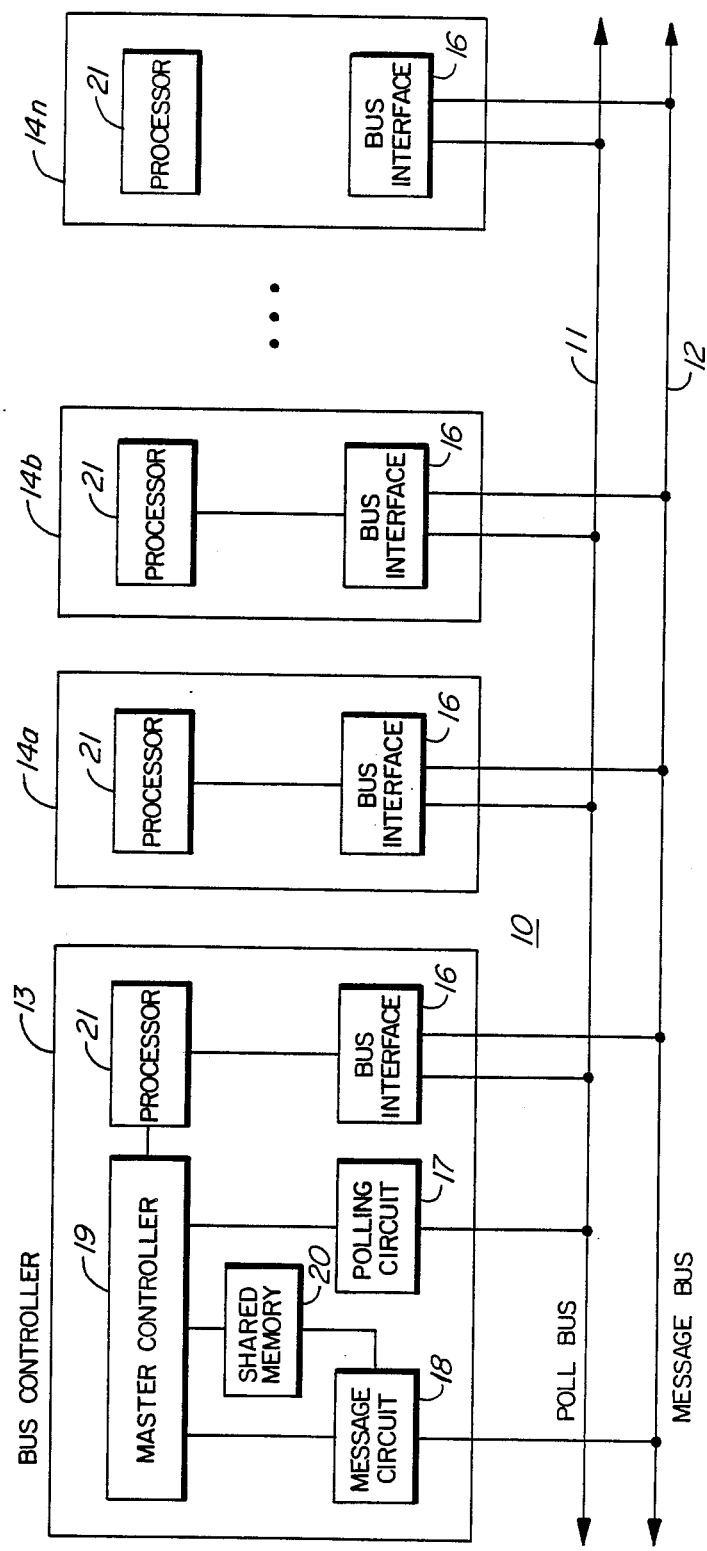
FIG. 1 is a simplified block diagram depicting the invention.

FIG. 1 depicts a bus arrangement or bus system 10 according to the present invention. Bus system 10 is comprised of a poll bus 11, a message bus 12 and, connected to these buses, a bus controller 13 and a plurality of processing elements 14a, 14b . . . 14n (referred to collectively as processing elements 14). There can be as many as 128 processing elements 14 connected to buses 11 and 12 since poll bus 11 contains seven leads for addressing.

If processing element 14a wishes to communicate with processing element 14b it does so by sending messages on message bus 12 first to bus controller 13 where they are stored momentarily before being forwarded to processing element 14b. In short each message transfer requires two traversals of the message bus 12: once to get from the sending or source processing element 14 to bus controller 13 and once again to get from bus controller 13 to the destination processing element 14.

Before it is described in more detail, the functions provided by bus controller 13 will be described. Bus controller 13 provides the following functions: (1) it arranges cooperative use of message bus 12 by other processing elements 14; (2) it effects message transfers on message bus 12; and (3) it distributes messages evenly between destination processing elements 14 where several destination processing elements 14 are eligible.

Bus controller 13 can itself be considered as a processing element of the bus system 10 and hence can send and receive messages over message bus 12. Note that each processing element 14, and in addition bus controller 13, has a bus interface 16 in order to communicate on the pool bus 11 and the message bus 12. Bus controller 13 and processing elements 14 use poll use 11 to arrange a transfer of messages over message bus 12. This separation of arbitration traffic (i.e. traffic on poll bus 11) from message traffic (i.e. traffic on message bus 12) allows the arbitration activity for waiting messages to proceed while a message is being transferred on message bus 12.

The elements of bus controller 13 will now be briefly described. Polling circuit 17 is the bus controller component that drives the poll bus 11. Message circuit 18 is the component that drives message bus 12. Master controller 19 is a high speed microcoded processor that controls message circuit 18 and polling circuit 17 and manages controller 13's message queues and message buffers (in shared memory 20). Processor 21 in bus controller 13 (e.g. a Motorola 68000) monitors and controls bus controller 13, loads code into and manages master controller 19 and message circuit 18, and manages polling circuit 17 and bus interface 16.

In the embodiment depicted in FIG. 1, 12,000 messages pass through bus controller 13 each second. Note that each message comprises on average 50 bytes. This means that master controller 19 must process each message in a total time of 45 microseconds or less.

A more detailed description of a message will now be given. Every message sent on message bus 12 from one processing element 14 to another processing element 14 passes on message bus 12 from the source processing element 14 to bus controller 13, where it is stored momentarily in a queue of messages having the same immediate destination. When the processor 21 (in one of the processing elements 14), which is the immediate destination, indicates its readiness to receive a message, the message is sent back over message bus 12 to it. For the simplified block diagram of FIG. 1, the immediate destination of the message is the final destination of the message.

Message bus 12 carries messages between bus controller 13 and processing elements 14. Poll bus 11 is the means by which bus controller 13 and the processing elements 14 arrange cooperative use of message bus 12. Bus controller 13 takes approximately 400 nanoseconds to poll a processing element 14. Thus, each processing element 14 is polled approximately once every 52 microseconds if there are 128 processing elements. Note that the polling activity on poll bus 11 continues at all times while messages are being transferred on message bus 12. Each poll is a signal which consists of a poll address and a poll mode. A poll address is a number between zero and one hundred and twenty seven which is allocated to and recognized by, one of the processing elements 14 on bus 11.

The poll modes of interest here are: POLL MESSAGE, POLL NO MESSAGE and ALLOCATE. When a bus controller 13 polls a valid poll address for which it has queued a message, it polls with a POLL MESSAGE poll mode. If the addressed element is in a state in which it can receive a message it will respond with a READ request. Bus controller 13 queues the READ request in a request queue in shared memory 20. While processing element 14 is waiting for bus controller 13 to service the READ request, bus controller 13 continues to send POLL MESSAGE polls to it to which the processing element 14 must respond UP. When the other outstanding requests have been dealt with, bus controller 13 will send an ALLOCATE poll to the processing element 14 during the last transfer on message bus 12 before it is the turn of the waiting processing element 14. Just before the ALLOCATE, bus controller 13 changes the poll mode to POLL NO MESSAGE if there are no further messages. The processing element 14 receiving the ALLOCATE poll knows that the next message on the message bus 12 will be the one it is waiting for.

When bus controller 13 polls a valid poll address for which it has an empty message queue, it polls with a POLL NO MESSAGE poll mode. To this poll, the element 14 may respond UP if it has no message to send or WRITE if it has a message to send. The procedure for a WRITE response is similar to that for the READ, except that the ALLOCATE is the signal for the element to send its message after the end of the current transfer on the message bus.

The poll list is the list of poll addresses of processing elements 14 to be polled. The poll list is kept in a dedicated memory in polling circuit 17 where it can be accessed quickly enough to poll one address every 400 nanoseconds. There may be up to 256 entries in the poll list. Each entry of the poll list is polled once in each poll cycle.

The poll list may contain more than one copy of a poll address. The number of occurrences of a poll address in the poll list is termed the repetition factor of the poll address. Repetition factors greater than one may be used to reduce the poll latency for processing elements 14 receiving a disproportionate share of the total traffic load on message bus 12. Bus controller 13 will normally poll all 128 poll addresses at least once in each poll cycle. When bus controller 13 first becomes active, the poll list is set to contain all poll addresses with a repetition factor of one. Polling circuit 17 can be commanded to change the repetition factor of any poll address.

Figure 2:
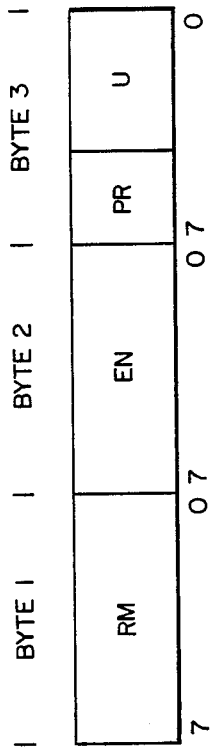
FIG. 2 is a stylized representation of a message header useful in understanding the operation of the invention.

Each message sent to or received by bus controller 13 is prefixed by a message header placed at the beginning of the message by the source processing element 14. The message header is displayed in FIG. 2 to which attention is directed. The message header contains the addressing information that is used by bus controller 13 to route the message to the destination. The whole message, including the message header and a 32 bit CRC (cyclic redundancy check) appended to the message by the sending buffer interface 16, is passed on unmodified by bus controller 13 to the destination.

Bus controller 13 validates the message and consequently the message header by validating the message's CRC. If the information in the message and thus the message header is found to be wrong, bus controller 13 simply discards the message with no further action taken. The significance of the fields of the message header may be described in terms of physical addressing, logical addressing, and external bus system addressing.

When the EN field of the message header is less than 128, the EN field is interpreted as a physical address. This means that the EN field of the message header specifies the poll address of the destination processing element 14 on buses 11 and 12. The poll address of a processing element 14 is a number to which that processing element will respond when the number is detected on poll bus 11.

When the EN field of the message header is greater than 127, the EN field is interpreted as a logical address. A logical address is not needed for the simplified embodiment shown in FIG. 1. Logical addressing is a method of applying the same address to several elements 14 (that are members of a logically defined group) when the message can be sent to any one of those elements. The element 14 that the message is actually sent to, is determined by scanning the queue sizes of each member of the group of elements so addressed and sending the message to the element 14 with the lowest queue size. The incoming messages are distributed to the element 14 in the group with the lowest queue size. If more than one of the elements 14 has the same size queue, then the messages are distributed evenly across those elements 14.

The translation of logical addresses to the list of possible destination elements 14 is done by master controller 19 using a translation table contained in shared memory 20 controlled by processor 21.

Each message header contains a priority field, PR, containing a priority value from 0 to 7 that is used to order the queue such that the highest priority messages are sent first. The queue, for any element 14, has a maximum size in order to prevent the queue of one element 14 taking a disproportionate number of the available messages due to overload. The fixed maximum queue size will require messages to be discarded once the quene is full. If a new message arrives and the destination queue is full then the priority of the new message is compared to the priority of the messages in the queue and the most recently received message with the lowest priority is discarded.

The RM field of the message header specifies the identification number of the destination bus system. There are 255 destination bus system addresses from 1 to 255. If the RM field is 0, tne RM field is to be ignored and the message routed within the same bus system 10 according to the EN field. This facility is provided so that messages can be sent to addresses within the same bus system 10 without having to be configured to contain the RM number.

If the RM number is other than 0 or the actual number of the subject bus system, master controller 19 routes the message to the correct bus system 10 by treating the RM number as a special class of logical address as described above. This logical address has a separate translation table in shared memory 20, controlled by processor 21.

What is claimed is:

1. A bus system for facilitating the transfer of information between a plurality of circuit means connected to said bus system, said bus system comprising:
   a polling bus;
   a message bus;
   a bus controller means, connected to both said polling bus and said message bus, both for controlling said polling bus and for exchanging information with said message bus;
   whereby information from a first circuit means of said plurality of circuit means, bound for a second circuit means of said plurality of circuit means, is transmitted on said message bus to said bus controller, is transmitted on said message bus to said bus controller, is temporarily stored at said bus controller, and is subsequently transmitted to said second circuit means;
   and whereby transmission or reception of messages is controlled by said first or second circuit means and access to said message bus is controlled by said bus controller means.

2. The bus system of claim 1 wherein said bus controller means periodically polls each said circuit means, connected to said bus system, in a regular fashion via said polling bus.

3. A bus system for providing a means of communication between at least first and second circuit means connected to said bus system, said bus system comprising:
   a polling bus;
   a message bus;
   a bus controller means, connected both to said polling bus and to said message bus, said bus controller means functioning both to control said polling bus and to accept information from said first circuit means via said message bus and to send information to said second circuit means via said message bus whereby said first circuit means can communicate with said second circuit means and whereby said polling bus is used by said bus controller means to arbitrate between which of said at least first or second circuit means should have access to said message bus and whereby transmission or reception of messages is controlled by said first or second circuit means.

4. The bus system of claim 3 wherein said bus controller means polls each of said at least first or second circuit means, connected to said bus system, in a periodic fashion via said polling bus.

5. The bus system of claim 3 wherein information from said first circuit means is sent to said second circuit means by the steps of:
   (a) sending the information to said bus controller means vis said message bus;
   (b) temporarily storing said information in said bus controller means; and
   (c) sending the information from said bus controller means to said second circuit means via said message bus.

6. The bus system of claim 4 wherein information from said first circuit means is sent to said second circuit means by the steps of:
   (a) sending the information to said bus controller means via said message bus;
   (b) temporarily storing said information in said bus controller means; and
   (c) sending the information from said bus controller means to said second circuit means via said message bus.

* * * * *